(12) United States Patent
Rock

(10) Patent No.: US 7,112,385 B2
(45) Date of Patent: Sep. 26, 2006

(54) FLOW RESTRICTORS IN FUEL CELL FLOW-FIELD

(75) Inventor: Jeffrey Allan Rock, Fairport, NY (US)

(73) Assignee: General Motors Corporation, Detroit, MI (US)

(*) Notice: Subject to any disclaimer, the term of this patent is extended or adjusted under 35 U.S.C. 154(b) by 461 days.

(21) Appl. No.: 10/664,294

(22) Filed: Sep. 17, 2003

(65) Prior Publication Data

US 2004/0151973 A1 Aug. 5, 2004

Related U.S. Application Data

(63) Continuation-in-part of application No. 10/356,403, filed on Jan. 31, 2003, now abandoned.

(51) Int. Cl.
*H01M 2/14* (2006.01)

(52) U.S. Cl. ............................ 429/38; 429/39; 429/30; 429/25

(58) Field of Classification Search ................. 429/38, 429/39, 34, 30, 32, 25
See application file for complete search history.

(56) References Cited

U.S. PATENT DOCUMENTS

| | | | |
|---|---|---|---|
| 6,099,984 A | 8/2000 | Rock | 429/39 |
| 6,309,773 B1 | 10/2001 | Rock | 429/34 |
| 6,358,642 B1 | 3/2002 | Griffith et al. | 429/34 |
| 6,428,916 B1 | 8/2002 | Grasso et al. | 429/13 |
| 6,528,196 B1 * | 3/2003 | Fujii et al. | 429/34 |
| 2003/0175577 A1 | 9/2003 | Rock | 429/39 |

* cited by examiner

*Primary Examiner*—Raymond Alejandro
(74) *Attorney, Agent, or Firm*—Cary W. Brooks

(57) ABSTRACT

Flow-field for a PEM fuel cell having a plurality of flow-channels including flow-restrictors strategically located throughout to achieve desired pressure differentials between fuel and oxidant supply and exhaust manifolds, and between adjacent flow-channels. A preferred flow-restrictor comprises a constriction in the flow channel that has a cross-sectional area that is less than the cross-sectional area of the flow-channel.

8 Claims, 8 Drawing Sheets

FLOW RESTRICTORS IN FUEL CELL FLOW-FIELD

RELATED APPLICATION

This is a Continuation-In-Part of U.S. patent application Ser. No. 10/356,403 (now abandoned) files Jan. 31, 2003 in the name of Jeffrey Rock, and assigned to the assignee of this application.

TECHNICAL FIELD

This invention relates to PEM fuel cells and more particularly to the reactant flow fields therefor.

BACKGROUND OF THE INVENTION

Fuel cells have been proposed as a power source for many applications. One such fuel cell is the PEM (i.e., Proton Exchange Membrane) fuel cell. PEM fuel cells are well known in the art and include in each cell thereof a so-called "membrane-electrode-assembly" (hereafter MEA) comprising a thin (i.e., ca. 0.0015–0.007 inch), proton-conductive, polymeric, membrane-electrolyte having an anode electrode film (i.e., ca. 0.002 inch) formed on one face thereof, and a cathode electrode film (i.e., ca. 0.002 inch) formed on the opposite face thereof. Such membrane-electrolytes are well known in the art and are described in such U.S. patents as U.S. Pat. Nos. 5,272,017 and 3,134,697, as well as in the Journal of Power Sources, Volume 29 (1990) pages 367–387, inter alia. In general, such membrane-electrolytes are made from ion-exchange resins, and typically comprise a perfluoronated sulfonic acid polymer such as NAFION™ available from the E.I. DuPont de Nemours & Co. The anode and cathode films, on the other hand, typically comprise (1) finely divided carbon particles, very finely divided catalytic particles supported on the internal and external surfaces of the carbon particles, and proton conductive material (e.g., NAFION™) intermingled with the catalytic and carbon particles, or (2) catalytic particles, sans carbon, dispersed throughout a polytetrafluoroethylene (PTFE) binder. One such MEA and fuel cell is described in U.S. Pat. No. 5,272,017 issued Dec. 21, 1993, and assigned to the assignee of the present invention.

The MEA is sandwiched between sheets of porous, gas-permeable, conductive material, known as a "diffusion layer", which press against the anode and cathode faces of the MEA and serve as (1) the primary current collectors for the anode and cathode, and (2) mechanical support for the MEA. Suitable such primary current collector sheets comprise carbon or graphite paper or cloth, fine mesh noble metal screen, and the like, through which the gas can diffuse, or be driven, to contact the MEA underlying the lands, as is well known in the art.

The thusly formed sandwich is pressed between a pair of electrically conductive plates which serve as secondary current collectors for collecting the current from the primary current collectors, and for conducting current between adjacent cells internally of the stack (i.e., in the case of bipolar plates), and externally of the stack (in the case of monopolar plates at the ends of the stack). The secondary current collecting plates each contain at least one active region including a so-called "flow-field" that distributes the fuel cell's gaseous reactants (e.g., $H_2$ or $O_2$/air) over the surfaces of the anode and cathode. The flow-field includes a plurality of lands which engage the primary current collector and define therebetween a plurality of grooves or flow-channels through which the gaseous reactants flow between a supply manifold in a header region of the plate at one end of the channel and an exhaust manifold in a header region of the plate at the other end of the channel.

The pressure differentials (1) between the supply manifold and the exhaust manifold, and (2) between adjacent flow channels, or segments of the same flow channel, are of considerable importance in designing a fuel cell. Serpentine channels have been used to achieve desired manifold-to-manifold pressure differentials as well as inter-channel pressure differentials. Serpentine flow-channels have an odd number of legs extending, in switchback style, between the supply and exhaust manifolds of the stack Serpentine flow channels use various widths, depths and lengths to vary the pressure differentials between the supply and exhaust manifolds, and may be designed to drive some reactant gas trans-land between adjacent channels, or between adjacent segments of the same channel, via the current collecting diffusion layer in order to expose the MEA confronting the land separating the legs to reactant. For example, some gas can flow from an upstream leg of a channel (i.e. where pressure is higher) to a parallel downstream leg of the same channel (i.e. where the pressure is lower) by moving the gas through the diffusion layer engaging the land that separates the upstream leg from the parallel downstream leg. Non-serpentine flow-channels have been proposed that extend more or less directly between the supply and exhaust manifolds, i.e. without any hairpin/switchback-type turns therein, and hence in shorter lengths than the serpentine flow-channels. Pressure differential management is more difficult with non-serpentine flow-channels than with serpentine flow-channels.

The present invention is directed to a PEM fuel cell flow-field that offers significant design flexibility in achieving desired pressure differentials between the supply and exhaust manifolds, between adjacent flow-channels, and/or between segments of the same flow-channel. The invention utilizes flow-restrictions strategically located throughout the flow-field to achieve the desired pressure differentials, and is particularly useful with non-serpentine flow-channels.

SUMMARY OF THE INVENTION

The present invention relates to a PEM fuel cell of the type that has (1) a proton exchange membrane having opposing cathode and anode faces, (2) a gas-permeable, electrically-conductive current collector engaging at least one of the faces, and (3) a current-collecting plate engaging the gas-permeable current collector, which current-collecting plate has a gas flow-field thereon that confronts the gas-permeable current collector. The flow-field comprises a plurality of lands that engage the gas-permeable current collector, and define a plurality of gas flow-channels through which the gaseous reactants (i.e. $H_2$ and $O_2$) flow. The flow-channels each have (a) an inlet end communicating with a supply manifold that supplies a reactant gas to the flow-channels at a first pressure, and (b) an exit end communicating with an exhaust manifold that receives the reactant gas from the flow-channels at a second pressure less than the first pressure. In accordance with the present invention, there is provided: (1) a first flow-restrictor in a first flow-channel for reducing the first pressure to a second pressure downstream of the first flow-restrictor that is less than the first pressure; and (2) a second flow-restrictor in a second flow-channel, next adjacent the first flow-channel, for maintaining a third pressure in the second flow-channel upstream of the second flow-restrictor sufficiently above the second pressure that it drives some of the gas from the second flow-channel into the first flow-channel through the gas-permeable current collector that engages the land that separates the two flow-channels. The flow-restrictor will preferably comprise a constriction in the flow channel that has a smaller cross-sectional area than the flow-channel itself Alternatively, the flow-restrictor could be a tortuous segment of flow-channel, or ports at the entrance to and exits from the flow-channels that are smaller than the flow-channels themselves. The flow-restrictors will preferably be located proximate the inlet and exit ends of the flow-channels where they can impact the upstream and downstream pressures over the longest lengths of flow-channel.

According to a preferred embodiment of the invention, a non-serpentine flow-field has a plurality of flow-channels each of which has (a) an inlet leg communicating with the supply manifold, (b) an exit leg communicating with the exhaust manifold, (c) at least one medial leg intermediate the inlet and exit legs, (d) a first flow-restrictor in the inlet leg of a first flow-channel for producing a second pressure downstream of the first flow-restrictor that is less than a first pressure in the supply manifold, and (e) a second flow-restrictor in the exit leg of a second flow-channel next adjacent the first flow-channel for maintaining a third pressure in the second flow-channel upstream of the second flow-restrictor that is sufficient to drive the gas between the first and second flow-channels through the gas permeable current collector that engages the land that separates the two flow-channels. Most preferably, each flow channel has a branched midsection so as to provide a medial leg that has at least first and second branches, each of which has a first end communicating with the inlet leg of the flow-channel, and a second end communicating with the exhaust leg of the flow channel. In this context (i.e. a flow-field having branched midsection): (i) one embodiment of the invention has the flow-restrictors located only in the inlet and outlet legs of the flow-channels; (ii) another embodiment has the flow-restrictors located only in the branches of the branched midsection; and (iii) in still another embodiment, the flow-restrictors are located in both the inlet/outlet legs and in the branches of the branched midsection.

BRIEF DESCRIPTION OF THE DRAWINGS

The invention will be better understood when considered in the light of the following detailed description of certain specific embodiments thereof which is given hereafter in conjunction with the several figures in which.

DESCRIPTION OF THE PREFERRED EMBODIMENT

Figure 1:
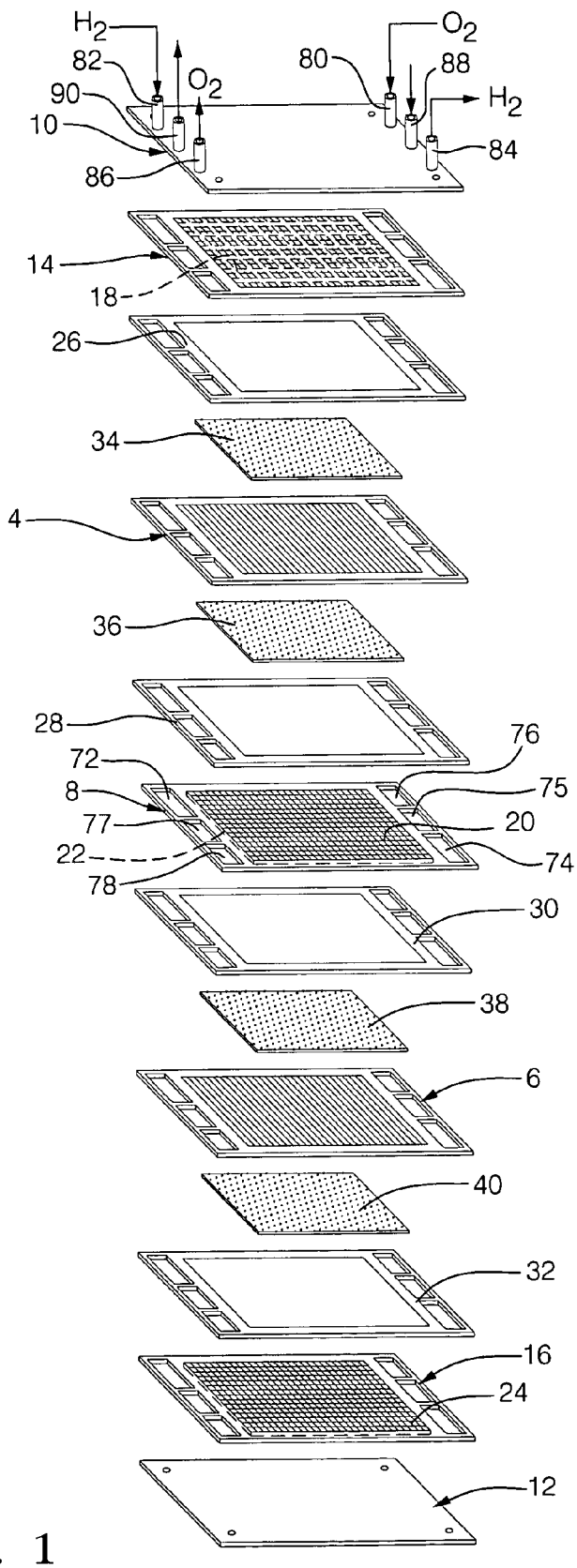
FIG. 1 is a schematic, exploded, isometric, illustration of a PEM fuel cell stack (only two cells shown)

For simplicity, only a two-cell stack (i.e. one bipolar plate) is illustrated and described hereafter, it being understood that a typical stack will have many more such cells and bipolar plates. FIG. 1 depicts a two-cell, bipolar PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and monopolar end plates 14 and 16. The clamping plates 10, 12 are electrically insulated from the end plates 14, 16 by a gasket or dielectric coating (not shown). The monopolar end plates 14 and 16, as well as both working faces of the bipolar plate 8, contain a plurality of grooves or channels 18, 20, 22, and 24 defining a so-called "flow field" for distributing fuel and oxidant gases (i.e., $H_2$ & $O_2$) over the faces of the MEAs 4 and 6. Nonconductive gaskets 26, 28, 30, and 32 provide seals and electrical insulation between the several components of the fuel cell stack. Gas-permeable carbon/graphite diffusion papers 34, 36, 38 and 40 press up against the electrode faces of the MEAs 4 and 6. The end plates 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6.

The bipolar plates 8 may comprise graphite, graphite-filled polymer, or metal. Preferably, the bipolar plates will comprise two separate metal sheets/panels bonded together so as to provide a coolant flow passage therebetween. Bonding may, for example, be accomplished by brazing, diffusion bonding, or gluing with a conductive adhesive, as is well known in the art.

Figure 2:
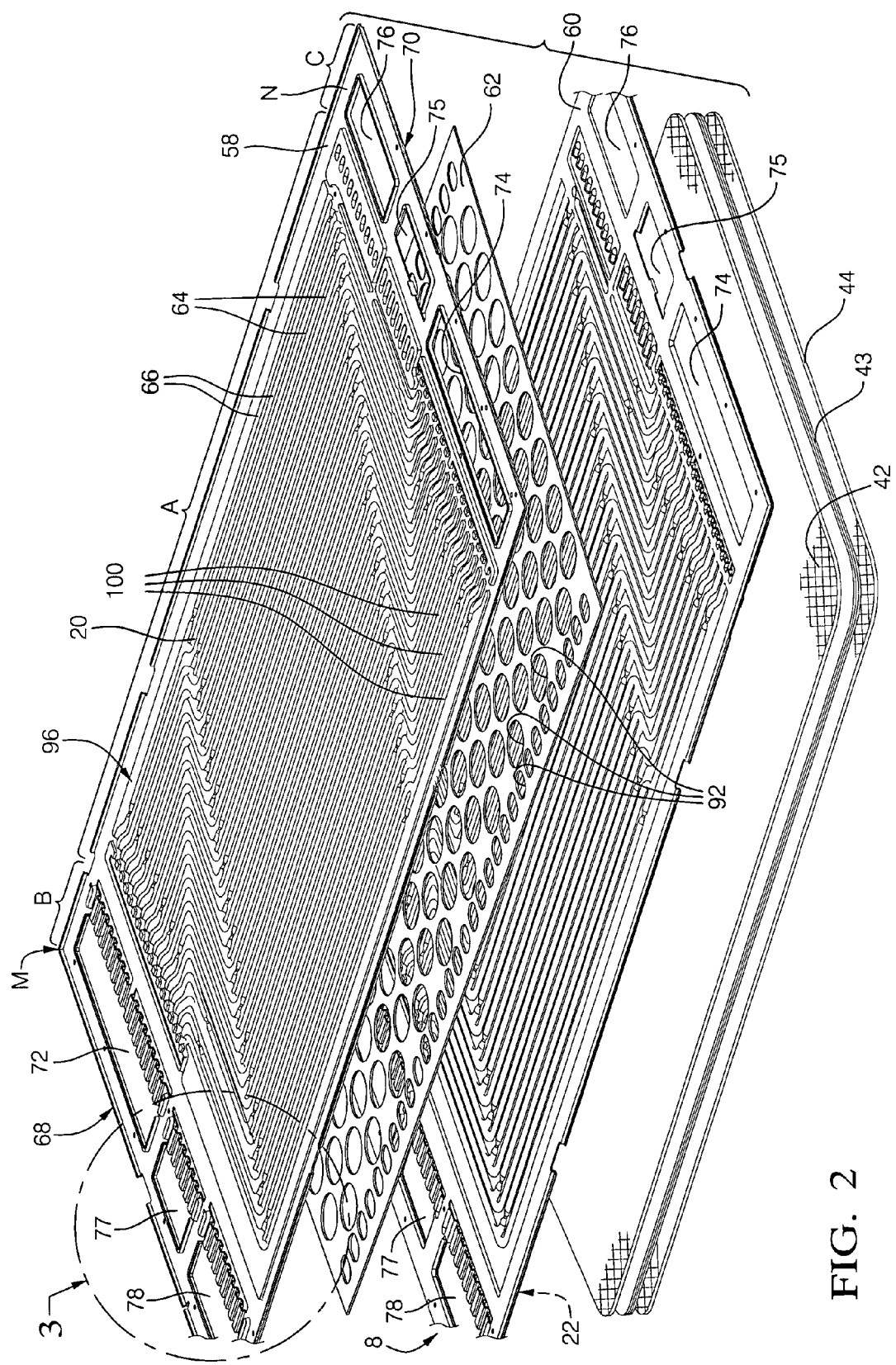
FIG. 2 is an isometric, exploded, view of an MEA and bipolar plate of a PEM fuel cell stack.

FIG. 2 is an isometric, exploded view of a bipolar plate 8, first primary porous current collector 42, MEA 43 and second primary porous current collector 44 as they are stacked together in a fuel cell. A second bipolar plate (not shown) would underlie the second primary current collector 44 to form one complete cell. Similarly, another set of primary current collectors and MEA (not shown) will overlie the upper sheet 58. The bipolar plate 8 comprises a first exterior metal sheet 58, a second exterior metal sheet 60, and an optional, perforated, interior metal sheet 62 which is brazed interjacent the first metal sheet 58 and the second metal sheet 60. The metal sheets 58, 60 and 62 are made as thin as possible (e.g., about 0.002–0.02 inches thick), and may be formed by stamping, by photo etching (i.e., through a photolithographic mask) or any other conventional process for shaping sheet metal. The external sheet 58 is formed so as to provide a reactant gas flow field characterized by a plurality of lands 64 which define therebetween a plurality of non-serpentine gas flow channels 66 through which one of the fuel cell's reactant gases (i.e. $O_2$) flows from near one edge 68 of the bipolar plate to near the opposite edge 70 thereof. When the fuel cell is fully assembled, the lands 64 press against the primary current collectors lying above it (not shown) which, in turn, presses against the MEA with which it is associated (not shown). In operation, current flows from the primary current collector through the lands 64 and thence through the stack. The $O_2$ gas is supplied to flow-channels 66 from a header or supply manifold formed by aligned openings 72 in the several plates, gaskets, etc., and exits the channels 66 via an exhaust manifold formed by aligned openings 74 in the several plates, gaskets, etc. $H_2$ is supplied to the flow-channels on the underside of plate 60 from a header or supply manifold formed by aligned openings 76 in the several plates, gaskets, etc., and exhausted through an exhaust manifold formed by aligned openings 78 in the several plates, gaskets, etc. Coolant passes between the sheets 58 and 60 from an inlet manifold formed by aligned openings 75 in the several plates, gaskets, etc. to an outlet manifold formed by openings 77 in the several plates, gaskets, etc. In this regard, the bipolar plate 8 (e.g. see FIG. 2) has a central active region "A" that engages the primary current collector, and is bordered by inactive header regions "B" and "C". The active region A has a working face having an cathode flow field 20 comprising a plurality of flow-channels 66 for distributing $O_2$ over the face of the MEA 4 that it confronts. A similar working face 22 on the opposite (i.e. anode) side (not shown) of the bipolar plate 8 serves to distribute air over the face of the MEA 6 that it confronts. The active region A of the bipolar plate 8 is flanked by two inactive header regions, or border portions, B and C that contain the several openings 72, 74, 75, 76, 77 and 78 therethrough. When the plates are stacked together, the openings in one bipolar plate are aligned with like openings in the other bipolar plates. Other components of the stack such as gaskets 26, 28, 30 and 32, as well as the membrane of the MEAs 4 and 6 and the end plates 14, 16 have corresponding openings (see FIG. 1) that align with the openings 72, 74, 75, 76, 77 and 78 in the bipolar plates in the stack, and together therewith form the aforesaid manifolds for supplying and exhausting gaseous reactants and liquid coolant to/from the stack. Referring to FIG. 1, oxygen/air is supplied to the air supply manifold 72 of the stack via appropriate supply plumbing 82, while hydrogen is supplied to the hydrogen supply manifold 76 via supply plumbing 80. Exhaust plumbing for both the $H_2$ (86) and $O_2$/air (84) are also provided for the $H_2$ and air exhaust manifolds. Additional plumbing 88 and 90 is provided for respectively supplying liquid coolant to, and removing coolant from, the coolant inlet 75 and outlet 77 manifolds.

Metal sheet 60 is similar to sheet 58. Like sheet 58, the underside of the sheet 60 has a working face 22 that engages the first current collector 42. An optional, perforated, interior, metal sheet 62 may be used interjacent the exterior sheets 58 and 60, and includes a plurality of apertures 92 that cause turbulent flow of the coolant for more effective heat exchange with the exterior sheets 58 and 60 respectively. The several sheets 58, 60 and 62 are preferably brazed together.

Figure 3:
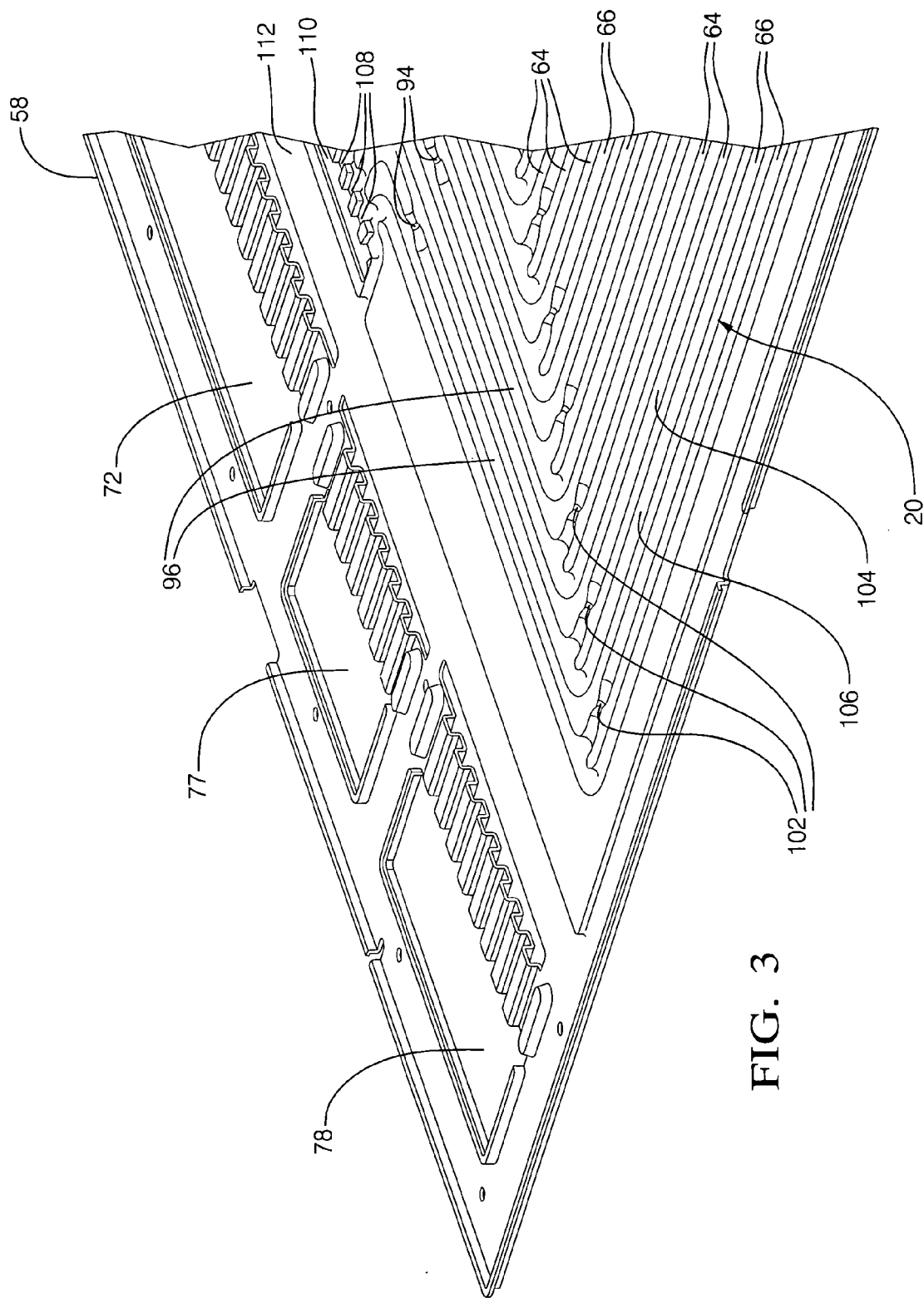
FIG. 3 is an enlargement of a portion of the bipolar plate of FIG. 2 where indicated thereon.
Figure 4:
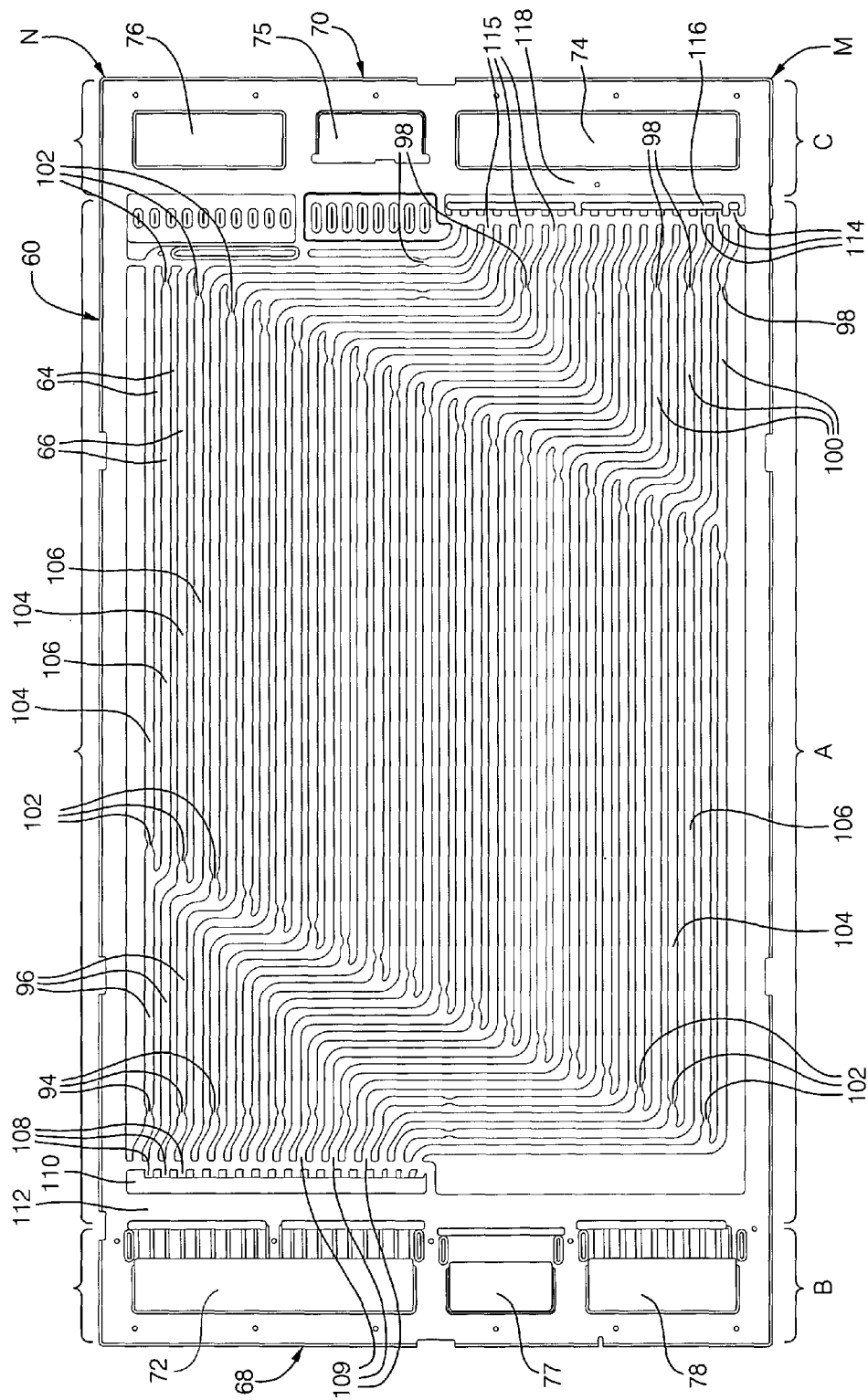
FIG. 4 is a plan view of the bipolar plate of FIG. 2.

FIGS. 3 and 4 are, respectively, an enlarged, isometric view of the corner of plate 58 where indicated on FIG. 2, and a plan view of plate 58 more clearly showing: several flow-restrictors 94 in the inlet legs 96 of the flow-channels 66; the several flow-restrictors 98 in the exit legs 100 of flow-channels 66; and the several flow-restrictors 102 in the branches/medial legs 104 and 106 of bifurcated flow-channels 66. In this regard, each flow channel has an inlet leg 96 communicating with the supply manifold 72, an exit leg 100 communicating with the exhaust manifold 74; and medial legs/branches 104 and 106, in the midsections of the flow-channels, communicating with the inlet and exit legs 96 and 100 as more fully described in copending U.S. patent application Ser. No. 10/654,504, that is filed concurrently herewith and is intended to be incorporated herein by reference. The inlet legs 96 communicate with the supply manifold 72 via a plurality of openings 108 and a slot 110 that communicates with the manifold 72 via a passageway (not shown) that underlies section 112 of the plate 60. Similarly, the exit legs 100 communicate with the exhaust manifold 74 via a plurality of openings 114 which in turn communicate with the exhaust manifold 74 via a slot 116 that communicates with the manifold 74 via a passageway (not shown) that underlies section 118 of the plate 60. The flow-restrictors are strategically positioned/located throughout the flow-field, as needed, to achieve desired pressure differentials therein. Several, but not all, such positionings/locations, are discussed hereinafter in conjunction with FIGS. 8–10.

The flow restrictors 94, 98, 102 will preferably comprise constrictions in the flow channels. In this regard, each flow channel 66 has a first cross-sectional area (i.e. transverse the direction of gas flow therein) that predominates throughout most of the length of the flow channel 66, and the constrictions 94, 96, 102 will have a second cross-sectional area that is less than the first cross-sectional area. Ideally, the several constrictions are sized to result in the same flow rate in all of the medial legs 104, 106 of the flow-channels 66, and the same flow rate in the inlet 96 and exit 100 legs of the flow-channels 66. In some circumstances it may be necessary for one or more of the flow-restrictors to have a different pressure drop than the other flow-restrictors. Hence one constriction may have a different cross-sectional area, than the other constrictions. For example, differences between the inlet and outlet flow rates may necessitate making the downstream constrictions more severe (i.e. smaller) than the upstream constrictions to achieve the same total pressure drop.

Figure 5:
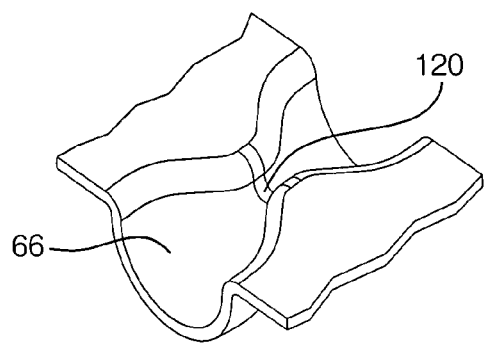
FIG. 5 is an enlarged, isometric view of one embodiment of a flow-restrictor (i.e. a short constriction) in accordance with the present invention.
Figure 6:
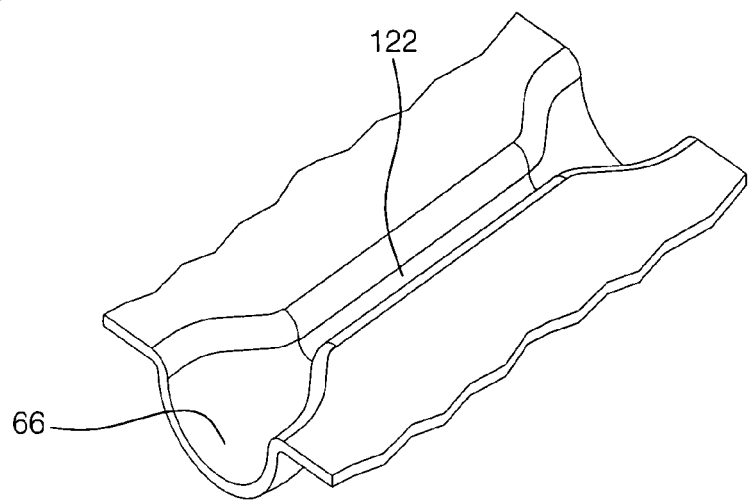
FIG. 6 is an isometric view of another embodiment of a flow-restrictor (i.e. an elongated constriction) in accordance with the present invention.
Figure 7:
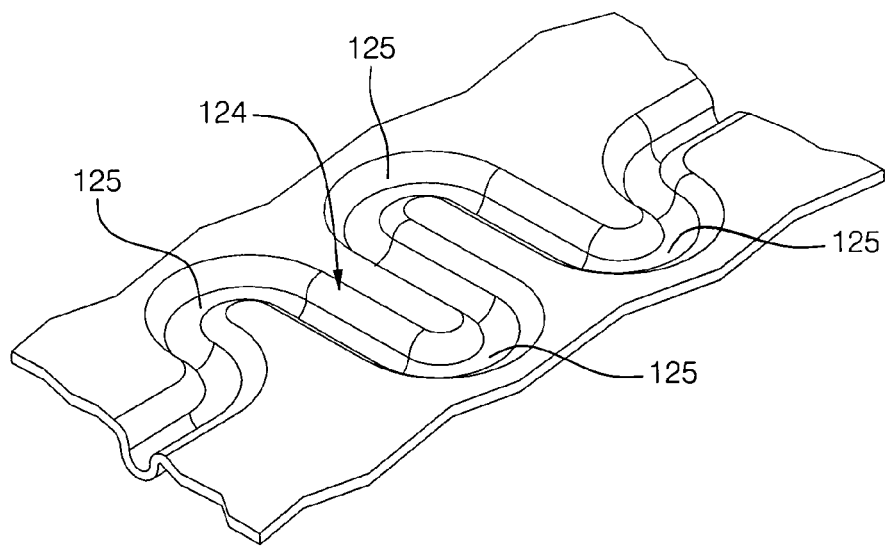
FIG. 7 is an enlarged, isometric view of still another embodiment of a flow-restrictor (i.e. tortuous-path) in accordance with the present invention.

FIGS. 5–7 depict alternative types of flow-restrictors. FIG. 5 depicts a preferred embodiment of a flow-restrictor in accordance with the present invention, and shows a short constriction 120 in the flow-channel 66. The constriction 122 of FIG. 6 is similar to FIG. 5 except that it is elongated to achieve a somewhat greater pressure drop thereacross for the same cross-sectional are as FIG. 5. FIG. 7 depicts a flow restrictor 124 that is a tortuous segment of the flow-channel 66 that utilizes extra flow-channel length and multiple hairpin turns 125 to provide a desired pressure drop in a short segment of flow-channel 66. Another alternative for the inlet 96 and exit 100 legs of the flow-channels 66 is to make the entrance and exit ports 109 and 115 (see FIG. 4) to/from the flow-channels 66 smaller than the channel itself.

Figure 8:
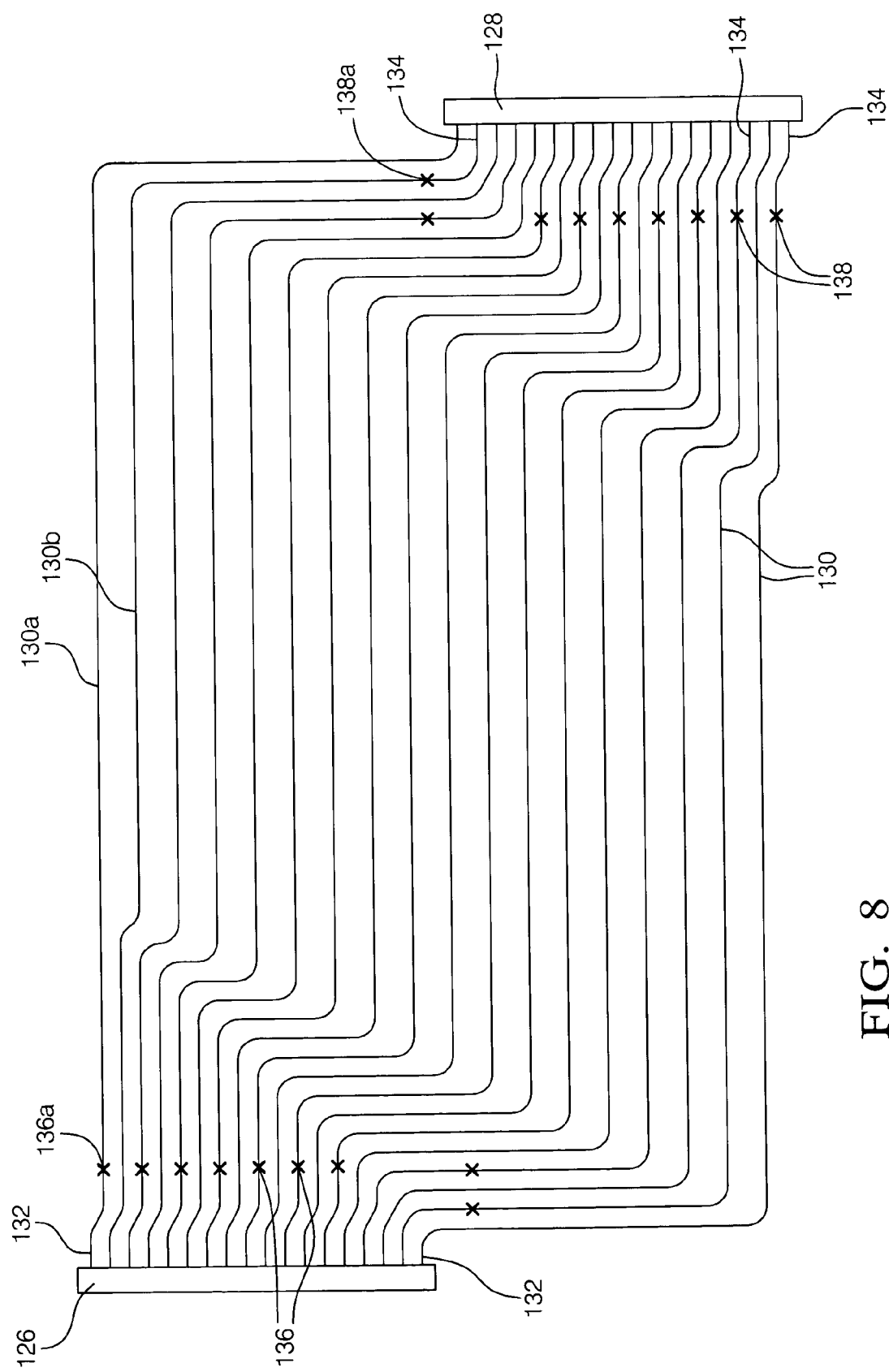
FIG. 8 schematically depicts one layout of a flow-field in accordance with the present invention, but showing only the centerlines of each of the flow-channels and the locations of the flow-restrictors.

FIG. 8 is a simplified representation of a flow-field showing only (a) the supply and exhaust manifolds, (b) the centerlines of each flow-channel, and (c) one embodiment of the placement of flow restrictors in accordance with the present invention. More specifically, FIG. 8 shows a supply manifold 126, an exhaust manifold 128, and a plurality of flow channels 130 (i.e. only the centerlines thereof shown) extending therebetween. Each flow-channel 130 has an inlet end 132 that communicates with the supply manifold 126, and an exit end 134 that communicates with the exhaust manifold 128. A plurality of flow-restrictors 136, 138 are strategically positioned in the flow-channels 130 to achieve desired pressure differentials throughout the flow-field.

More specifically yet, a flow restrictor 136 is positioned near the inlet end 132 of every other flow channel 130 (e.g. the odd numbered flow-channels). Similarly, a flow restrictor 138 is placed near the exit end 134 of all the other flow-channels 130 (e.g. the even numbered flow-channels). Hence, a first flow-channel 130(a) has a flow restrictor 136(a) near its inlet end 132, while a next adjacent second flow-channel 130(b) has a flow restrictor 138(a) near its exit end 134. A reactant gas is supplied to the flow-channels from the supply manifold 126 at a first pressure. The flow-restrictor 136a in the first flow-channel serves to immediately drop the pressure in the first flow-channel 130(a) downstream of the flow-restrictor 136a while the pressure in the second flow-channel 130b remains essentially the same as in the supply manifold 126 (i.e. less any losses attributable to the length of the second flow-channel) which is greater than that in the first flow-channel 130a downstream of flow restrictor 136a. Proper sizing of the flow-restrictors results in: a sufficient pressure differential between the first and second flow-channels 130a, 130b to drive gas therebetween through the intervening gas-permeable current collector; and an equal pressure drop between the inlet 132, and exit 134 ends of the first and second flow-channels. The same principles apply to the remaining sets of adjacent flow-channels of the flow field.

Figure 9:
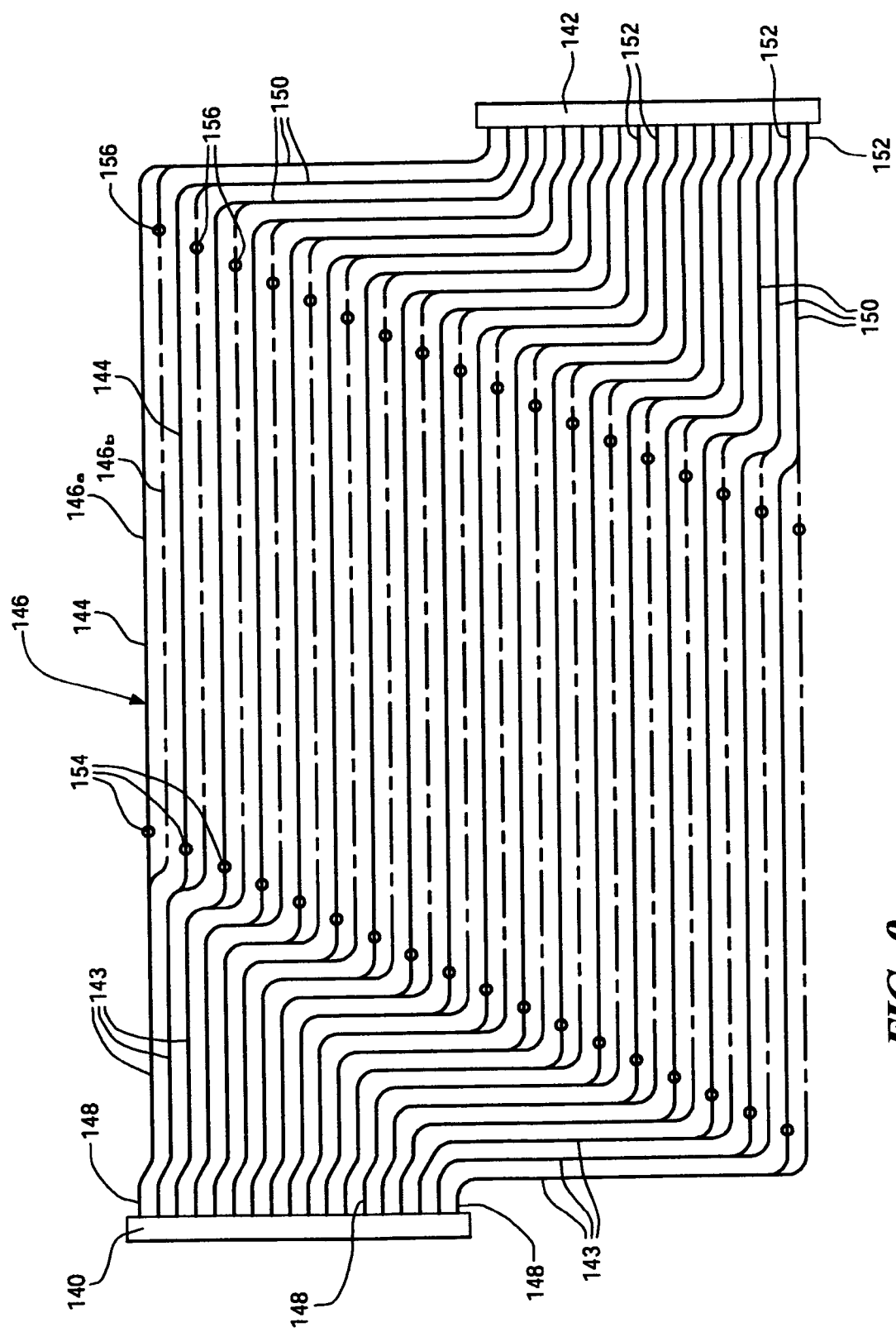
FIG. 9 schematically depicts another layout of a flow-field in accordance with the present invention, but showing only the centerlines of each of the flow-channels and the locations of the flow-restrictors.

Like FIG. 8, FIG. 9 is a simplified representation of a flow-field showing only (a) the supply and exhaust manifolds, (b) the centerlines of each flow-channel, and (c) another embodiment of the placement of the flow restrictors in accordance with the present invention. More specifically, FIG. 9 shows a supply manifold 140, an exhaust manifold 142, and a plurality of flow channels 144 extending therebetween. Each flow-channel 144 has: an inlet leg 143 having an inlet end 148 that communicates with the supply manifold 140; an exit leg 150 having an exit end 152 that communicates with the exhaust manifold 142; and at least one medial leg 146. In the embodiment shown, each flow-channel 144 is bifurcated at its midsection so as to provide two branches or medial legs 146 (a) and 146(b) for each flow channel 144. The medial legs/branches 146(a) and 146(b) each communicate with the inlet and exit legs 143 and 150 for receiving and exhausting a reactant gas from and to the supply 140 and exhaust 142 manifolds, respectively. In this embodiment, flow restrictors 154 are positioned in one of the branches/medial legs 146(a) near the inlet leg 143 and flow restrictors 156 are positioned in another, next-adjacent branch 146b near the exit leg 150. Proper sizing of the flow-restrictors 154, 156 establishes a pressure differential between adjacent branches 146a, 146b of the same bifurcated flow-channel 144 sufficient to drive reactant gas therebetween through the intervening gas-permeable current collector. The same principles apply to the remaining bifurcated flow-channels of the flow field.

Figure 10:
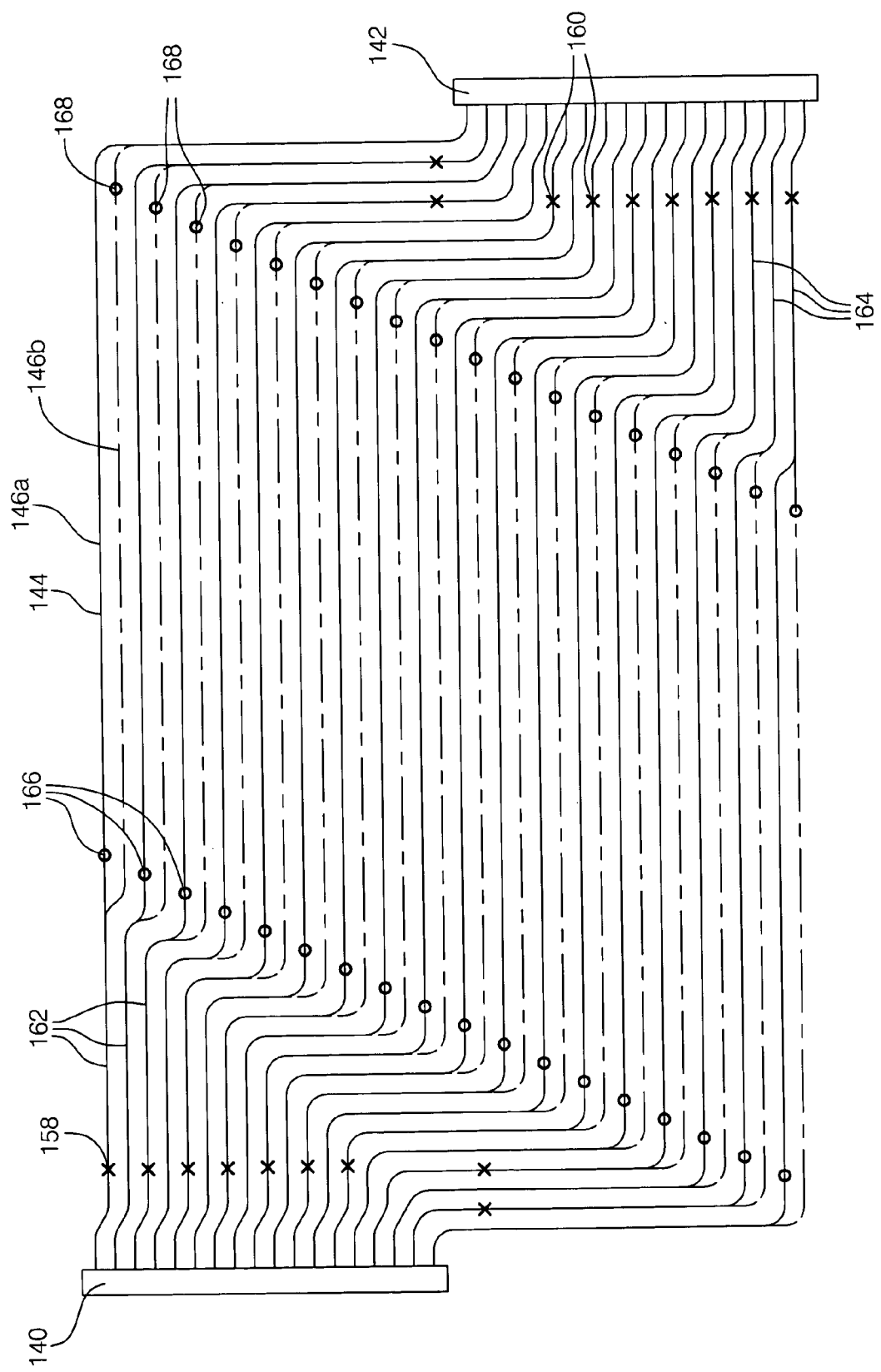
FIG. 10 schematically depicts still another layout of a flow-field in accordance with the present invention, but showing only the centerlines of each of the flow-channels and the locations of the flow-restrictors.

FIG. 10 is a simplified representation of a flow-field showing only (a) the supply and exhaust manifolds, (b) the centerlines of each flow-channel, and (c) still another, and preferred, embodiment of the placement of the flow restrictors in accordance with the present invention. More specifically, FIG. 10 depicts a combination of the flow-restrictor placements of the embodiments shown in FIGS. 8 and 9. In this regard, flow-restrictors 158 and 160 are positioned in the inlet and exit legs 162 and 164, respectively, and flow restrictors 166 and 168 are positioned at the beginning of one medial leg 146(a), and at the end of another medial leg 146(b) of the same bifurcated flow-channel 144.

When using flow-restrictors 154, 156 only in the branches 146a, 146b of the bifurcated midsection (see FIG. 9) of flow-channels 144, none of the inlet 143 and exit 150 legs would have pressure differentials. When using flow-restrictors only in the inlet and exit legs, but not in the branches of a bifurcated flow-channel, half of the branches would have no pressure differential with their neighbor. When using flow-restrictors 158, 160, 166, 168 in both the inlet/exit legs and in the branches of the bifurcated midsection (see FIG. 10), the inlet 162 and exit 164 legs would have uniform pressure differentials, and half of the bifurcation branches 146a, 146b would have more pressure differential than the rest. This is considered to be the preferred condition since the criteria for pressure differential is that it should drive enough flow to provide better stack performance than achievable only by diffusion through the gas-permeable current collector yet not so much flow that it causes the membranes to dry out.

Virtually unlimited placement possibilities exist for the location of the several flow-restrictors depending on the pressure differential profile sought to be achieved by the flow-field designer. Hence, the invention is not limited to the specific embodiments set forth above, but rather only to the extent set forth hereafter in the claims which follow.

The invention claimed is:

1. A PEM fuel cell comprising (1) a proton exchange membrane having opposing cathode and anode faces on opposite sides of said membrane, (2) a gas-permeable electrically-conductive current collector engaging at least one of said faces, and (3) a current-collecting plate engaging said gas-permeable current collector, said current collecting plate having a gas flow-field confronting said gas-permeable current collector, said gas flow-field comprising a plurality of lands engaging said gas-permeable current collector and separating a plurality of gas flow-channels one from the next, said gas flow-channels each having (a) an inlet end communicating with a supply manifold that supplies a reactant gas at a first pressure to all of said gas flow-channels, and (b) an exit end communicating with an exhaust manifold that receives said gas from said gas flow-channels, a first flow-restrictor in a first gas flow-channel to reduce said first pressure to a second pressure in said first gas flow-channel downstream of said first flow-restrictor that is less than said first pressure, and a second flow-restrictor in a second flow-channel next adjacent said first flow-channel for maintaining a third pressure in said second gas flow-channel upstream of said second flow-restrictor that is greater than said second pressure and sufficient to drive said gas from said second gas flow-channels into said first flow-channel through such of said gas-permeable current collector as engages the land separating said first gas flow-channel from said second gas flow-channel.

2. A PEM fuel cell according to claim 1 wherein said gas flow-channels each has a first cross-sectional area transverse the direction of gas flow through said gas flow-channel, and at least one of said flow-restrictors comprises a constriction in said gas flow-channel having a second cross-sectional area transverse the direction of gas flow through the gas flow-channel that is less said than said first cross-sectional area.

3. A PEM fuel cell according to claim 1 wherein at least one of said flow-restrictors comprises a tortuous segment of said gas flow-channel.

4. A PEM fuel cell according to claim 1 wherein at least one of said flow-restrictors is a port communicating one of said manifolds with one of said gas flow-channels and sized to provide said second and/or third pressures.

5. A PEM fuel cell comprising (1) a proton exchange membrane having opposing cathode and anode faces on opposite sides of said membrane, (2) a gas-permeable, electrically-conductive current collector engaging at least one of said faces, and (3) a current-collecting plate engaging said gas-permeable current collector, said current-collecting plate having a gas flow-field confronting said gas-permeable current collector, said gas flow-field comprising a plurality of lands engaging said gas-permeable current collector and separating a plurality of non-serpentine gas flow-channels one from the next, said gas flow-channels each having (a) an inlet leg communicating with a supply manifold that supplies a reactant gas at a first pressure to all said gas flow-channels, (b) an exit leg communicating with an exhaust manifold that receives said gas from said gas flow-channels, and (c) at least one medial leg intermediate said inlet and exit legs, a first flow-restrictor in the inlet leg of a first of said flow channels for producing a second pressure in said first gas flow-channel downstream of said first flow-restrictor that is less than said first pressure, and a second flow-restrictor in the exit leg of a second said gas flow-channel next adjacent said first gas flow-channel for maintaining a third pressure in said second gas flow-channel upstream of said second flow-restrictor that is greater than said second pressure and sufficient to drive said gas between said first and second flow-channels through such of said gas permeable current-collector as engages the land separating said first gas flow-channel from said second gas flow-channel.

6. A PEM fuel cell according to claim 5 wherein each said flow-channel is branched at its midsection so as to provide a medial leg having at least first and second branches separated from each other by a land engaging said gas-permeable current collector, each of said branches having a first end communicating with said inlet leg and a second end communicating with said exhaust leg.

7. A PEM fuel cell according to claim 6 wherein said medial leg is bifurcated and said first branch has a third flow-restrictor proximate said first end that reduces the pressure in said first branch down stream of said third flow-restrictor to a fourth pressure that is below said second pressure, and said second branch has a fourth flow-restrictor proximate said exit leg for maintaining a fifth pressure in said second branch upstream of said fourth flow-restrictor sufficient to drive said gas between said first and second branches through such of said gas-permeable current collector as engages the land separating said first and second branches.

8. A PEM fuel cell comprising (1) a proton exchange membrane having opposing cathode and anode faces on opposite sides of said membrane, (2) a gas-permeable electrically-conductive current collector engaging at least one of said faces and (3) a current-collecting plate engaging said gas-permeable current collector, said current collecting plate having a gas flow-field confronting said gas permeable current collector, said gas flow-field comprising a plurality of lands engaging said gas-permeable current collector and separating a plurality of non-serpentine gas flow-channels one from the next, said gas flow-channels each having (a) an inlet leg for receiving gas at a first pressure from a supply manifold common to all said flow channels, (b) an exit leg for discharging said gas into an exhaust manifold common to all said flow-channels, and (c) first and second medial legs intermediate said inlet and exit legs and separated one from the next by a land, said medial legs each having a first end communicating with said inlet leg and a second end communicating with said exit leg, said first medial leg having a first flow-restrictor proximate said first inlet leg that reduces the pressure in said first medial leg down stream of said first flow-restrictor to a second pressure that is below said first pressure, and said second medial leg has a second flow-restrictor proximate said exit leg for maintaining a third pressure in said second medial leg upstream of said second flow-restrictor that is greater than said second pressure and sufficient to drive said gas between said first and second medial legs through such of said gas-permeable current collector as engages the land separating said medial legs.

* * * * *